April 28, 1964 F. H. LASTER 3,130,506
DITCH DIGGING ATTACHMENT FOR FARM TYPE TRACTORS
Filed Sept. 18, 1959 4 Sheets-Sheet 1
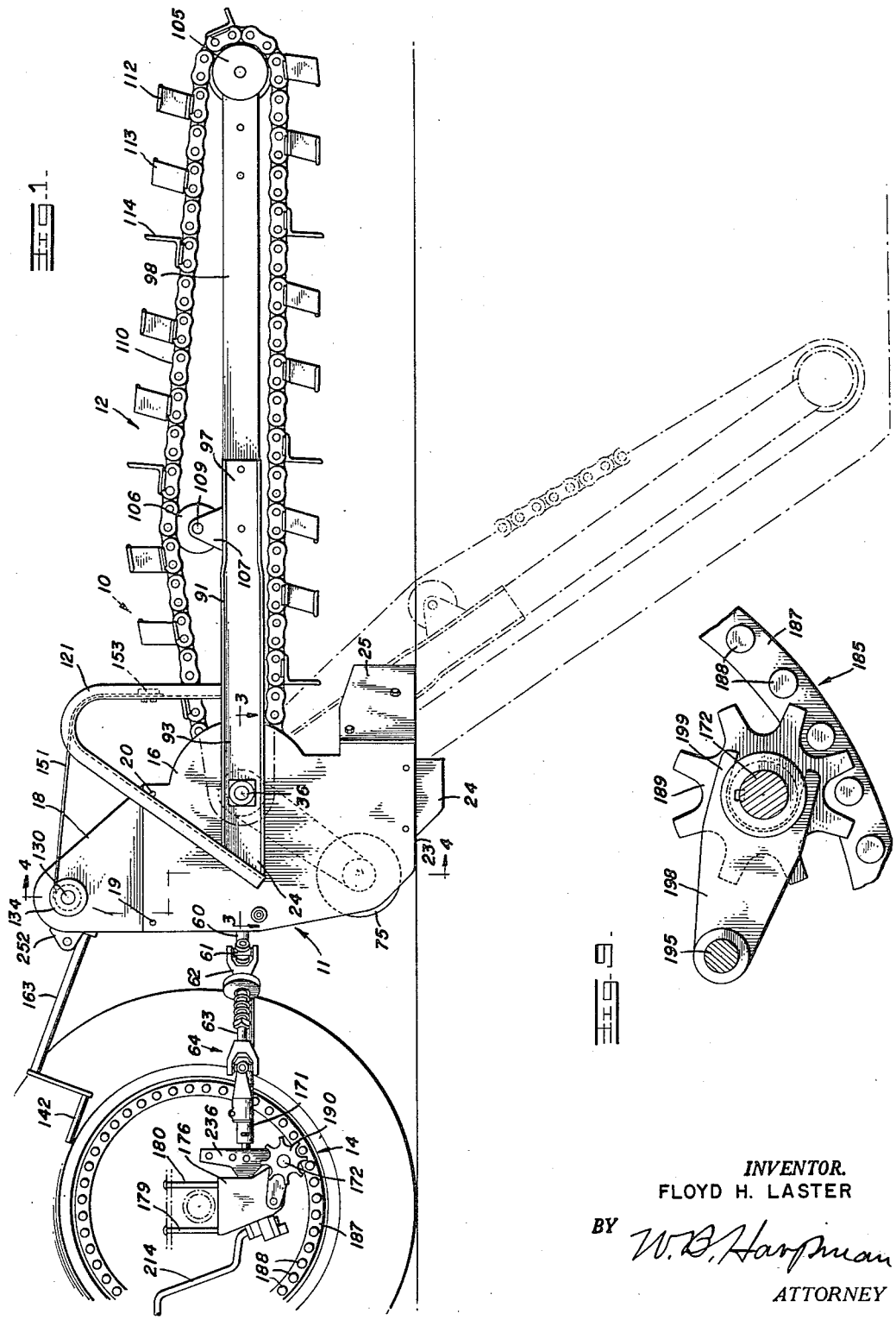
INVENTOR.
FLOYD H. LASTER
BY W. B. Harpman
ATTORNEY

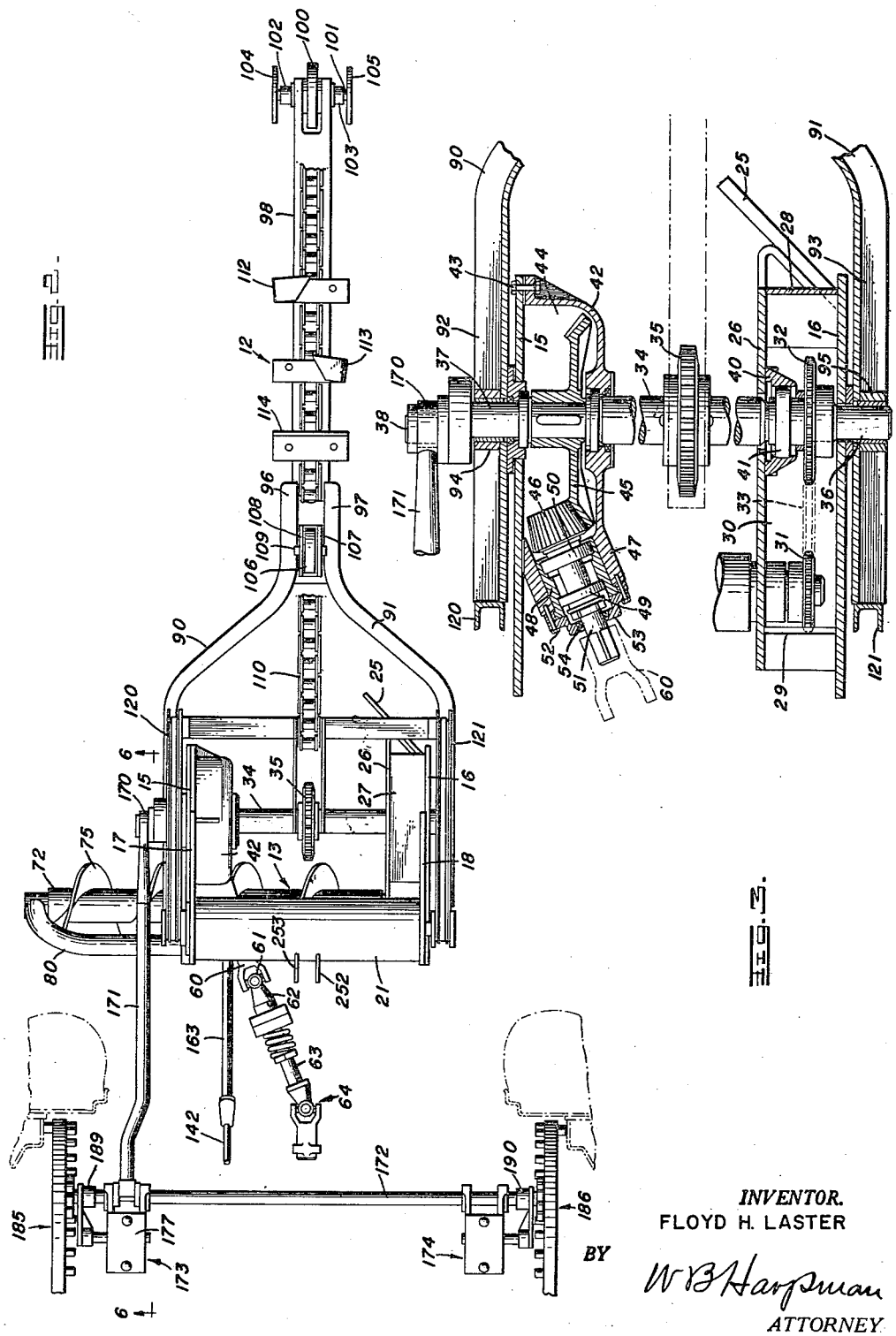

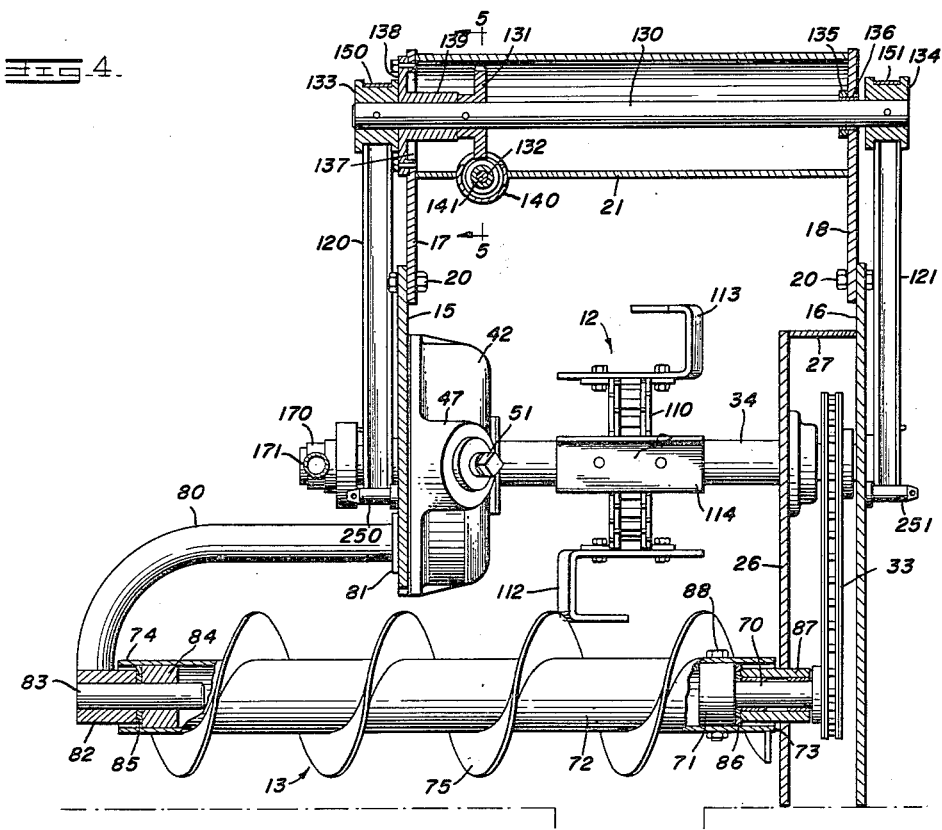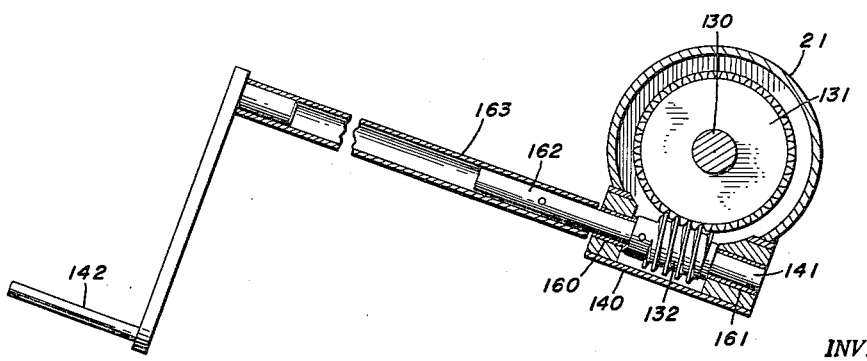

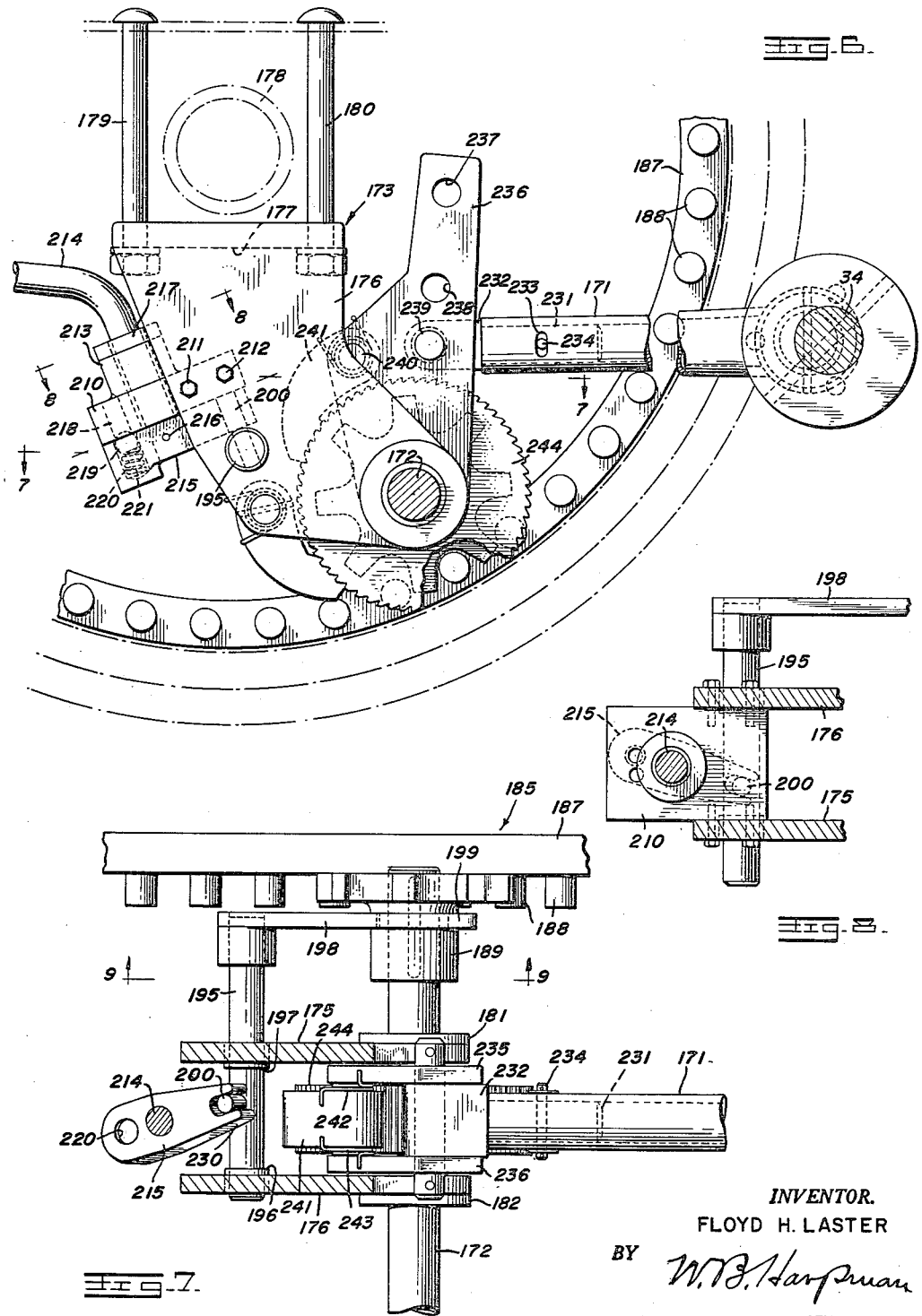

United States Patent Office 3,130,506
Patented Apr. 28, 1964

3,130,506
DITCH DIGGING ATTACHMENT FOR FARM TYPE TRACTORS
Floyd H. Laster, Farmdale, Ohio
Filed Sept. 18, 1959, Ser. No. 840,963
18 Claims. (Cl. 37—86)

This invention relates to a digging attachment for tractors and pertains, more particularly, to attachments of this nature which incorporate not only a digging tool but also a tool for moving the excavated dirt to one side and means for synchronizing the operation of the digger with the forward movement of the tractor to which the implement is attached. This application is a continuation in part of my copending application Serial No. 687,206, filed September 30, 1957, now abandoned, and entitled Ditch Digging Attachment for Farm-Type Tractor.

Generally, digging implements of the type which are attached to tractors do not have provision for the lateral movement of the earth being dug to place it out of the way but still in a position to permit easy replacement of the earth back into the trench originally dug nor, in general, do such mechanisms provide for means to synchronize the digging action of the digging attachment with the forward movement of the tractor. It is common and usual for such attachments to require the operator of a tractor to skillfully control the forward movement of the tractor in order to achieve co-ordination between the digging action and the forward movement such as will permit the attachment to dig the trench to the proper depth and to prevent overloading of the mechanism which might otherwise occur if the forward speed of the tractor is too great.

It is, therefore, of primary concern in connection with this invention to provide a novel digging attachment for conventional farm tractors wherein means is provided to synchronize the digging action of the attachment with the forward movement of the tractor so as to achieve an optimum relationship therebetween to most effectively and rapidly dig trenches.

A further object of this invention is to provide improvements in digging attachments for tractors incorporating a digging means and in combination and association therewith means for moving the dirt elevated to the surface of the ground in a lateral direction to place it more advantageously to one side of the ditch and thereby increase the efficiency of the device as well as to thereby obviate any tendency for the dirt to become lodged in such position as would endanger the trench or ditch in any way.

Another object of this invention is to provide a novel digging attachment for tractors which operates from the power take off thereof and which is also provided with a novel power train leading not only from the power take off to the digging attachment, but which also has a power path leading back to the tractor for imparting forward movement to the tractor which is synchronized with the digging operation of the attachment so as to achieve a synchronism and correlation therebetween to most effectively produce the desired end results, whereby the normal power train of the tractor for imparting forward motion thereto is not utilized, relieving the operator of the necessity for controlling the forward speed of the tractor separately.

A further object of this invention is to provide a novel power train for ditch digging attachments in which the power train cooperates with the component parts of the assemblage to achieve a novel arrangement therewith and by means of which the necessary and desired drives are effected in a most advantageous and practical manner, while at the same time maintaining a satisfactory degree of simplicity therein.

A further object of this invention is to provide improvements in trench or ditch diggers of the type adapted to be utilized in conjunction with a tractor having hydraulic lift arms and attachment means and wherein the digging attachment also includes means adapted to be associated with the tractor drive wheels for imparting a forward motion to the tractor which is synchronized and correlated with the operation of the digging portion of the attachment.

Still another object of this invention is to provide a digging attachment for tractors which includes a mechanism having digging means and a power train associated therewith for driving the digging means which, in turn, is operated from the power take off of the tractor and with the drive means also having a drive feed back device and assemblage including means attached directly to the tractor drive wheels which imparts a synchronized and correlated forward motion to the tractor in association with the operation of the digging means.

A further object of this invention is to provide a novel digging attachment in accordance with the preceding object wherein the feed back drive to the drive wheels of the tractor includes mechanism under control of the operator of the vehicle to selectively disconnect and establish this drive at will and wherein such feed back drive is adjustable to impart variable forward speed to the tractor with relation to the operation of the digging means as necessitated by conditions of soil and so forth which may dictate the necessity and desirability for such variable forward motion and synchronized drive of the tractor.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

FIG. 1 is a side elevational view of the attachment device constructed in accordance with this invention and showing the same positionally related with the rear portion of a conventional type of farm tractor, illustrating the latter only diagrammatically and in sufficient detail to show the relative position of the instant device relative thereto and illustrating in dotted lines an operative position of the trenching or digging means and showing the same in full lines in an out of the way position;

FIG. 2 is a top plan view of the assembly shown in FIG. 1;

FIG. 3 is an enlarged sectional view taken substantially along the plane of section line 3—3 in FIG. 1, and illustrating in greater detail certain constructional features of the novel drive mechanism;

FIG. 4 is a vertical section taken substantially along the plane of section line 4—4 in FIG. 1, illustrating the mechanism for moving the dug earth laterally away from the region of the trench and further showing the relationship of the drive mechanism relative thereto;

FIG. 5 is an enlarged vertical section taken substantially along the plane of section line 5—5 in FIG. 4 and illustrating in greater detail the worm drive mechanism for raising and lowering the digger means;

FIG. 6 is an enlarged vertical section taken substantially along the plane of section line 6—6 in FIG. 2, illustrating details of the mechanism for imparting forward motion to the tractor in synchronization and correlation with the operation of the digger means and which mechanism forms a continuation or feed back of the power train of the attachment;

FIG. 7 is a horizontal sectional view taken substantially along the plane of section line 7—7 in FIG. 6, illustrating details of the shifting mechanism for selectively interrupting or establishing the forward motion drive of the attachment;

FIG. 8 is an enlarged sectional view taken substantially along the plane of section line 8—8 in FIG. 6, illustrating further details of the shifting mechanism; and FIG. 9 is a sectional view taken substantially along the plane of section line 9—9 in FIG. 7, illustrating further details of the forward drive mechanism.

Referring now more particularly to the drawings, reference numeral 10 indicates, in general, the digging attachment which, in turn, incorporates in general a main frame portion indicated generally by the reference character 11, a digger means indicated generally by the reference character 12, a transverse auger means indicated generally by the reference character 13, and a mechanism indicated generally by the reference character 14 for imparting forward motion to the tractor in synchronization with the operation of the digger means 12 and the transverse auger 13.

The frame 11 includes a pair of upstanding side plates 15 and 16, each of which is provided with an upper extension as indicated by the reference characters 17 and 18. The vertical extensions are suitably anchored to the upper edges of the side plates 15 and 16 by means of fasteners, such as those indicated by the reference characters 19 and 20, with the extensions 17 and 18, in turn, being rigidly secured to each other through the medium of a transversely extending tube or housing 21, see particularly FIG. 4.

As can be best seen in FIG. 4, the side plate 15 terminates along its lower edge in spaced relation above the ground, whereas the side plate 16 extends all the way to the ground surface. This lower edge 23 of the side plate 16 is provided with an extension 24 forming a stabilizing blade and angling inwardly from the rear edge of the side plate 16 is a deflector blade 25 adapted, as will be later seen, to direct dirt toward the trench ahead of the trenching mechanism 12.

Parallel to the side plate 16 on the inner side thereof is a wall plate 26 being rigidly interconnected to the inner side of the plate 16 by a cover plate 27 and by a rear wall 28 at the rear side thereof and by a front wall 29 at the forward side thereof, see particularly FIG. 3. These wall members form a chamber 30 housing the sprocket gears 31 and 32 which are interconnected by a chain 33. The sprocket 32 is feathered to one end portion of shaft 34 which extends between and through the opposite side plates 15 and 16, this shaft being provided intermediate its ends with a sprocket 35 keyed thereto which forms the main drive sprocket of the digger assembly 12.

At that end of the shaft 34 which is adjacent the sprocket 32, there is provided a stub shaft extension 36 and the opposite end of the shaft is provided with a similar stub shaft extension 37 and beyond this stub shaft extension with an eccentric portion 38, the purpose of which will be presently apparent.

Fixed to the inner side of the wall 26 is a bearing cup or seat 40 within which a suitable ball or roller bearing 41 is provided which journals the shaft at this point. Fixed to the inner surface of the side plate 15 is a housing 42 demountably attached thereto as by means of fasteners 43 and which forms a chamber 44 with the inner side of the plate 15 housing a crown or bevel gear 45 keyed to the shaft 34 and also a pinion 46 meshing with the bevel gear 45. This housing 42 is provided with a boss portion 47 receiving a bearing sleeve 48 which, in turn, contains a pair of spaced roller or ball bearings 49 and 50 journalling the pinion shaft 51 with which the pinion 46 is integral. For the purpose of holding the sleeve 48 in place within the boss 47, there are provided cap screws 52 which also serve to hold the cover plate 53 in place. The cover plate 53 retains a conventional grease seal 54, it being understood that the chamber 44 is partially filled with suitable gear lubricant for proper operation of the bevel gear and pinion.

As can be best seen in FIGS. 1 and 2, the pinion shaft has a universal joint fork 60 attached thereto which cooperates through the medium of the universal joint cross 61 with a further universal joint fork 62 on the power take off shaft 63 being connected through a further universal joint assembly indicated generally by the reference character 64 to the conventional power take off shaft of the tractor, which is not shown but whose construction is entirely conventional as is well understood in the art.

Thus, it will be evident that operation of the power take off shaft of the tractor will impart a drive to the shaft 63 and, consequently, to the pinion shaft 51 which, in turn, through the pinion 46 and crown wheel 45 imparts rotary motion to the main shaft 34 of the attachment.

The previously mentioned sprocket 31 is feathered to one end of an auger stub shaft 70, see particularly FIG. 4, which has an enlarged head portion 71 snugly received within one end of an auger tube or shaft 72. The auger tube or shaft 72 terminates at one end portion 73 thereof in closely spaced relationship with the inner side of the wall plate 26 and at its opposite end 74 at a point laterally spaced a considerable distance from the ditching assembly 12. The auger is of generally conventional construction inasmuch as it employs a single auger blade 75 thereon helically extending therearound and projecting therefrom, and the operation of which is such as to move debris and dirt laterally of the device as will be well understood.

The end 74 of the auger tube is supported through an outrigger brace 80 which is rigidly affixed at one end, as, for example, through the medium of an integral flange 81 to the outer surface of the side plate 15 and which is provided at its opposite end with a boss portion 82 receiving therein a journal pin 83 which extends completely therethrough and inwardly thereof to project inwardly of and through a bearing sleeve 84 snugly affixed within the auger tube 72. Thrust washer means 85 may be provided between the bearing sleeve 84 and the opposing face of the boss 82 and, in like manner, bearing means 86 may be provided adjacent the opposite end of the auger tube between the enlarged head 71 of the stub shaft 70 and the opposing face of bearing sleeve 87 which is rigidly affixed to the wall plate 26. Some means, such as the through bolt 88, is provided for effecting a drive between the enlarged head 71 and the auger tube, as will be clearly evident. Thus, when the power take off of the tractor is operated and the main shaft 34 of the attachment is rotating, the auger tube 72 also rotates by virtue of the chain and sprocket connection 31, 32, 33.

The ditcher assembly 12 includes a main frame composed of a pair of rearwardly convergent arms 90 and 91 having laterally spaced parallel portions 92 and 93 provided intermediate their ends with bearing sleeves 94 and 95 which rotatably receive the stub shaft ends 36 and 37 of the shaft 34. The rearward ends 96 and 97 sandwich therebetween a rearwardly extending frame piece 98 which carries at its rearward end the guide roller 100 rotatably mounted on a cross shaft 101 journalled within suitable sleeves 102 and 103 rigid with the frame piece 98. The opposite ends of the shaft 101 carry lateral retaining discs 104 and 105.

A further guide and tensioning roller 106, see particularly FIGS. 1 and 2, is mounted within a saddle including the spaced ears 107 and 108 which carry therebetween a cross shaft 109 journalling this roller 106. This tensioning roller engages the upper flight 110 of an endless chain which is also trained over the previously mentioned sprocket 35 and the guide or idler roller 100. The action and construction of the ditcher chain 110 is of generally conventional nature. Mounted on the outer side of the chain are series of blades 112, 113 and 114. As can be best seen in FIG. 2, the blades 112 dig from one side, the blades 113 dig from the opposite side and the blades 114 are primarily utilized for conveying the loosened or dug earth upwardly out of the trench.

The portions 92 and 93 of the ditcher frame are provided with generally inverted U-shaped guide channels 120 and 121 rigidly affixed thereto in any suitable manner and projecting upwardly therefrom as shown.

The previously mentioned housing 21 houses a shaft 130 having a worn gear 131 rigidly affixed thereto and in mesh with a worm 132. The opposite ends of the shaft 130 project outwardly beyond the extension plates 17 and 18 and have rigidly affixed thereto the pulleys or spools 133 and 134. The extension plate 18 is provided with a ring 135 on its inner side cooperating with the plate itself to retain a bearing or bushing 136 and the extension plate 17 is provided with an enlarged opening 137 to permit removal of the shaft 130 as well as the worm gear 131. This opening is covered by an end plate 138 having a centrally disposed and inwardly projecting spool or bearing sleeve extension 139 through which the shaft projects and is journalled. Opposite end faces of this spool 139 are engaged against the worm gear 131 and the spool 133 respectively serving to position the shaft 130 properly within the housing and preventing axial shifting thereof.

A housing 140 is provided and rigidly attached to the tube 21 and journals therewithin one end of a crank shaft 141 which is provided at its opposite end with an offset handle 142 through the medium of which the crank shaft and, consequently, the worm 132 will selectively rotate and which operation consequently rotates the shaft 130 and the spools 133 and 134. The spools 133 and 134 have anchored thereto one end of flexible straps or bands 150 and 151, the opposite ends of which are secured within the rearward upstanding portions of the members 120 and 121, as, for example, is shown in dotted lines and indicated by the reference character 153 in FIG. 1. Thus, rotation of the shaft 130 will effect vertical movement of the ditcher assembly 12 about the pivot axis of the shaft 34 since the frame is supported from and journalled upon the stub shaft extensions 36 and 37 previously described.

The details of the crank are shown more clearly in FIG. 5. In this figure, it will be seen that the housing 140 is of generally tubular configuration having a central cutaway portion on one side thereof gearing the worm wheel 131 and permitting the same to project into engagement with the worm 132. The crank shaft 141 is journalled within suitable bearings 160 and 161 at opposite ends of the housing 140 and projects outwardly from this housing in the portion 162. The portion 162 is received within one end of the crank shaft tube 163, the opposite end of which receives the handle assembly as will be evident.

Referring more particularly to FIGS. 2 and 3, it will be seen that the eccentric portion 38 of the shaft 34 is encircled by the boss end 170 of a connecting rod 171 which extends forwardly from the shaft 34 above the auger assembly 13 and terminates in a ratchet mechanism as hereinafter set forth for imparting a step by step rotary motion to an axle shaft 172. The axle shaft is supported from the associated tractor through the medium of a pair of support brackets indicated generally by the reference characters 173 and 174. As can be seen best from FIGS. 6 and 7, each of the brackets 173 and 174 includes a pair of spaced vertical leg plates 175 and 176 interconnected at their upper ends by a top plate 177. The top plate in each case is adapted to abut and underlie the housing 178 of the rear axle of a tractor and through bolts 179 and 180 operate to clamp the brackets in each case rigidly to the tractor structure.

The leg plates 175 and 176 extend downwardly and then rearwardly and at their lower and rearmost corners carry suitable bushings for rotatably receiving the axle shaft and to thereby rotatably support the same. Thrust washers 181 and 182 are fixed to the shaft 172 and engage on the opposite outer sides of the leg plates 175 and 176 to position the axle shaft 172 and prevent any axial displacement thereof beyond that which would normally be provided for clearance purposes.

Forming a part of the attachment according to the present invention is a pair of drive gears or rings indicated generally by the reference characters 185 and 186. Each such gear comprises a ring 187, see particularly FIG. 6, having a series of equally circumferentially spaced pins or teeth 188 fixed to and projecting laterally inwardly from the inner side thereof. Any suitable means may be provided for rigidly attaching each such ring to the inner sides of the associated tractor wheels. For example, these rings may be detachably bolted thereto or they may be welded directly to the wheels. The axle shaft 172 carries a pair of drive gears or star wheels 189 and 190 which are feathered to the shaft but which are axially slidable therealong. These gears or star wheels are permitted of sufficient axial movement along the shaft 172 to engage or disengage from meshing relationship with the teeth 188 on the gears 185 and 186.

The leg plates 175 and 176 also form a support for a shifting rail 195, there being provided bushings 196 and 197 for this purpose, see particularly FIG. 7. The shift rail 195 in each case carries a shifting fork 198 at one end thereof which extends laterally therefrom and terminates in a bifurcated end portion 199 which is received within a circumferential groove in the hub of each associated gear 189 and 190. Between the leg plates 175 and 176, each shift rail is provided with an upstanding lug 200, through means of which the shift rails may be axially moved to consequently correspondingly move the gears 189 and 190 into and out of mesh with the gears 185 and 186. To effect this shifting movement, a fixed block member 210, see particularly FIG. 6, is sandwiched between the leg plates 175 and 176 and rigidly affixed therebetween as by the fasteners 211 and 212. This fixed block 210 is provided with an upstanding boss 213 and is apertured through the boss and through the block proper to rotatably receive a shifting lever 214. Fixed to the extremity of the shifting lever 214 is a shifting head 215, being suitably pinned to the shifting lever as by pin 216. This shifting head engages the underside of the fixed block 210 and to prevent shifting of the head and shifting lever 214 relative to the block, there is provided a thrust collar or washer 217 on the shifting lever 214 engaging the upper surface face of the boss 213, as will be evident.

The undersurface of the block 210 is provided with a pair of openings or depressions 218 into which may be projected the ball 219 carried by the shifting head 215, such ball being received in a recess 220 in the shifting head and being urged under the action of spring 221 into engagement within the openings or depressions 218. It will be understood that the depressions 218 and the ball 219 are so related that the ball is engaged in one or the other of the depressions depending on whether the shifting mechanism has effected the engagement or disengagement of the gears 189 or 190 with their respective wheel gears. The shifting head 215 is, of course, provided with a bifurcated end portion 230 embracing the previously mentioned lug 200 on the shift rail 195 in each case so that the rocking motion imparted to the shifting head 215 by virtue of the manually actuated shifting levers 214 will impart axial movement to the rails 195 and consequently actuation of the gears 189 and 190.

As previously mentioned, the connecting rod terminates in a pawl and ratchet connection to the drive shaft 172. This construction is shown most clearly in FIGS. 6 and 7. The forward end of the connecting rod 171 is hollow and receives the shank 231 of a clevis member having an enlarged head 232. The hollow end of the connecting rod is provided with diametrically opposed openings or slots 233 receiving therethrough a pin 234 which extends through the shank 231 serving to connect the clevis to the forward end of the connecting rod. The clevis head 232 is sandwiched between a pair of lever plates 235 and 236 which are apertured at their lower ends to receive the shaft 172 and permit rocking relative thereto. The lever plates 235 and 236 are provided with a series of horizontally aligned openings such as those indicated by the reference characters 237 and 238 and the clevis head 232 is provided with a transverse bore so that the pivot pin 239 may be projected through the lever plates and the clevis head to effect a mechanical connection therebetween. Since the several openings, such as those indicated by the reference characters 237 and 238 are radially spaced from the axis of the shaft 172, it will be seen that the particular openings selected for connection therethrough by means of the pin 239 to the clevis head will effect a greater or lesser rocking action of the lever plates 235 and 236 as the connecting rod 171 is reciprocated under the action of the eccentric 38 of shaft 34.

The lever plates 235 and 236 carry a pawl shaft 240 therebetween upon which a pawl 241 is pivotally carried, there being suitable spring means 242 and 243 of a conventional nature associated with the pawl normally urging it into and toward engagement with the ratchet wheel 244. The ratchet wheel 244 is rigidly affixed to the shaft 172 and it will be evident that reciprocation of the connecting rod 171 and, consequently, oscillatory motion of the lever plates 235 and 236 will impart a step by step rotary motion to the drive shaft 172 and consequently a forward motion of the tractor which carries the attachment.

Concerning the manner of attachment of the assemblage to the tractor, the side plates 15 and 16, as will be seen best in FIGS. 1 and 4, are provided with outstanding lugs 250 and 251 which are adapted to receive the conventional trailing arms associated with tractors commonly in use. Additionally, see particularly FIG. 2, the tube 21 is provided with a pair of forwardly extending lugs 252 and 253 apertured as shown in FIG. 1, to receive the trailing stabilizing link from the tractor.

In the operation of the device, it will be evident that the tractor transmission remains in neutral so that no forward motion is imparted to the tractor directly through the normal drive train therefor. Instead, the power take off of the tractor alone supplies the motive power not only for the trencher 12 but also the auger 13 and the mechanism which imparts the forward drive to the tractor through the drive shaft 172. Thus, the power take off drive is fed rearwardly to the auger and the trenching or digging assembly and then is diverted forwardly through the connecting rod 171 to impart a step by step forward motion to the tractor. In this manner, the forward motion of the tractor is always definitely related to and synchronized with the operation of the trenching mechanism and the auger mechanism so as to avoid overloading these members and to also provide for the proper operation of both. Since it is obvious that different types of soil under different conditions will permit a greater or lesser forward speed of the tractor for a given operational speed of the trenching and auger mechanisms, the forward drive of the tractor can be varied by altering the connection between the clevis 232 and the lever plates 235 and 236 as provided for by the radially spaced openings in the lever plates. If at any time, on the other hand, it is desired to disconnect the step by step forward drive to the tractor, the shifting levers 214 may be manually operated to disconnect this drive and thereafter, of course, the conventional forward drive mechanism for the tractor may be employed which may be desirable under certain circumstances.

I claim:

1. A trenching attachment for tractors comprising a main frame assembly adapted to be attached to a tractor in trailing relation thereto, said main frame including a transverse main shaft journalled therein, a gear housing on said main frame having a shaft for connection to the power take off of a tractor and being connected to impart rotary motion to said main shaft, an auger shaft assembly supported by said main frame below and forwardly of said main shaft and in generally parallel fixed relation thereto, drive means connecting said main and auger shafts, and a ditching or trenching mechanism carried by said main frame and extending rearwardly therefrom and including a connection to said main shaft for operation thereby, said ditching mechanism including a pair of rearwardly convergent frame arms having their forward ends journalled upon opposite ends of and supported by said main shaft and sandwiching therebetween, at their rearward ends, a rearwardly extending frame element, said connection to the main shaft being in the form of a sprocket fixed to said main shaft substantially intermediate the ends thereof, an idler roller at the rearward extremity of said rearwardly extending frame element, and an endless chain trained over said sprocket and said idler pulley and carrying digging elements thereon.

2. A trenching attachment for tractors comprising a main frame assembly adapted to be attached to a tractor in trailing relation thereto, said main frame including a transverse main shaft journalled therein, a gear housing on said main frame having a shaft for connection to the power take off of a tractor and being connected to impart rotary motion to said main shaft, an auger shaft assembly supported by said main frame below and forwardly of said main shaft and in generally parallel fixed relation thereto, drive means connecting said main and auger shafts, and a ditching or trenching mechanism carried by said main frame and extending rearwardly therefrom and including a connection to said main shaft for operation thereby, said ditching mechanism including a pair of rearwardly convergent frame arms having their forward ends journalled upon opposite ends of and supported by said main shaft and sandwiching therebetween, at their rearward ends, a rearwardly extending frame element, said connection to the main shaft being in the form of a sprocket fixed to said main shaft substantially intermediate the ends thereof, an idler roller at the rearward extremity of said rearwardly extending frame element, an endless chain trained over said sprocket and said idler pulley and carrying digging elements thereon, and means for selectively pivoting said digger frame about the axis of said main shaft.

3. A trenching attachment for tractors comprising a main frame assembly adapted to be attached to a tractor in trailing relation thereto, said main frame including a transverse main shaft journalled therein, a gear housing on said main frame having a shaft for connection to the power take off of a tractor and being connected to impart rotary motion to said main shaft, an auger shaft assembly supported by said main frame below and forwardly of said main shaft and in generally parallel fixed relation thereto, drive means connecting said main and auger shafts, and a ditching or trenching mechanism carried by said main frame and extending rearwardly therefrom and including a connection to said main shaft for operation thereby, said ditching attachment including a pair of rearwardly convergent frame members having their forward ends journalled upon opposite ends of said main shaft and sandwiching therebetween, at their rearward ends, a rearwardly extending frame element, said connection to the main shaft being in the form of a sprocket fixed to said main shaft substantially intermediate the ends thereof, an idler roller at the rearward extremity of said rearwardly extending frame element, an endless chain trained over said sprocket and said idler pulley and carrying digging elements thereon, means for selectively pivoting said digger frame about the axis of said main shaft, the last mentioned means including inverted generally U-shaped stands mounted upon and secured to the forward ends of said rearwardly convergent frame elements, a shaft journalled on said main frame a gear housing secured to the inner face of one of said plate assemblies, a secondary housing secured to the inner face of the opposite plate assembly, a main shaft extending transversely between and through said plate assemblies and through said gear housing and said secondary housing, a bevel gear keyed to said main shaft within said gear housing, a pinion member supported by said gear housing and meshing with said bevel gear and including a pinion shaft projecting from the gear housing and adapted for connection to the power take off of an associated tractor, an auger assembly including a drive shaft portion projecting into said secondary housing, drive means within said secondary housing interconnecting said main shaft and said auger shaft for rotation of the latter in conjunction with the rotation of the main shaft, a sprocket fixed to said main shaft intermediate said gear housing and said secondary housing, a digger frame including opposite side members pivotally mounted on opposite projecting end portions of said main shaft exteriorly of said plate assemblies and extending rearwardly therefrom in convergent relation, a rearwardly projecting frame element fixed between the rearward ends of said rearwardly convergent frame members and carrying at its end an idler roller aligned with said sprocket on the main shaft, a chain trained about said sprocket and over said idler roller and carrying digging teeth thereon, means for selectively pivoting said digger frame relative to the main frame, an eccentric formed on one end of said main shaft beyond an associated frame member of the digger frame, a connecting rod engaged and journalled upon said eccentric and extending forwardly therefrom, a drive shaft adapted to be mounted on an associated tractor and carrying drive pinions at its opposite ends, supplementary drive gears adapted to be attached to the inner sides of the wheels of an associated tractor in mesh with said drive pinions on the drive shaft, a pawl and ratchet mechanism interconnecting the forward end of said connecting rod and said drive shaft whereby rotation of said main shaft through the medium of said pinion and its shaft will effect synchronized operation between the digger, the auger and forward motion of the tractor as imparted through said connecting rod.

11. The assembly as defined in and by claim 10 wherein said pawl and ratchet mechanism includes means for varying the stroke thereof to achieve a greater or lesser speed in the forward motion of the tractor.

12. The assembly as defined in and by claim 11 wherein means is provided for selectively engaging and disengaging said drive pinions from said supplementary drive gears.

13. The assembly as defined in and by claim 10 wherein means is provided for selectively engaging and disengaging said drive pinions from said supplementary drive gears.

14. A ditching attachment for tractors comprising a main frame assembly, a pair of vertically spaced shafts rotatably mounted in said frame and disposed transversely thereof in horizontal attitude, the upper of said shafts having a gear box in encircling relation therewith and rigidly secured to said frame, a power input shaft supported by and extending into said box and drivingly connected within the box to said upper shaft and adapted for connection to the power take-off of an adjacent and associated vehicle, an auger fixed to the lower of said shafts, said upper shaft extending completely through said frame so as to expose the opposite ends thereof on either side of the frame, a ditcher frame carried by said main frame and including a pair of rearwardly projecting arms straddling said main frame and journalled upon the exposed opposite ends of said upper shaft whereby the ditcher frame is pivotable about the axis of said upper shaft, means carried by said main frame above said upper shaft and connected to said ditcher frame to swing the ditcher frame about the axis of said upper shaft to raise and lower the rearwardly extending portion of the ditcher frame, said upper shaft having a sprocket fixed thereto and said ditcher frame having a sprocket fixed to the rearward extremity thereof, an excavating tool carrying chain trained about said sprockets, and means connecting said upper and lower shafts for rotating the lower shaft in response to rotation of the upper shaft.

15. A ditching attachment for tractors comprising a main frame including a pair of substantially vertical plate-like side members, the lower edge of one of said side members being spaced vertically above the lower edge of the other of said side members, an auger shaft assembly, means connected with said other side member and rotatably supporting one end of said auger shaft adjacent to the lower extremity of said other member, said auger shaft extending from the said means toward the opposite side of the frame and passing beneath the lower extremity of said one side member, an outrigger brace fixed at one end to the lower extremity of said one side member and extending therefrom to the outer extremity of said auger shaft and journalling the same therein, a main shaft journalled between said side members in vertically spaced relation above and parallel to said auger shaft and extending completely through said frame so as to extend outwardly on opposite sides thereof to expose the opposite ends of said main shaft, said shafts being drivingly interconnected, a gear box fixed to said one side member housing an intermediate portion of said main shaft, an input shaft journalled in said gear box and having drive connection internally of the gear box with said main shaft whereby the main shaft may be driven from the power take-off of an associated tractor, a trencher frame including a pair of rearwardly projecting arms having their forward ends straddling said main frame and journalled upon the exposed opposite ends of said main shaft, means carried by said main frame above said main shaft and connected to said trencher frame for raising and lowering the same about the axis of said main shaft, trenching means carried by said trencher frame and driven directly by said main shaft.

16. A ditching attachment for tractors comprising a main frame including vertically extending, spaced side members, the lower extremity of one of said side members being spaced vertically with respect to the lower extremity of the other side member, an elongate auger means extending transversely of said main frame, means connected with said other side member and rotatably supporting one end of said auger means adjacent to the lower extremity of said other side member, said auger means being of such length as to extend from the said supporting means therefor to and beyond said one side member, an outrigger brace fixed at one end to said one side member and extending laterally outwardly therefrom and journalling at its other end the outer free end of the auger means, said one end of the auger means having a sprocket fixed thereto, a main shaft extending transversely of the main frame parallel to said auger means and completely through said side members to expose the opposite ends thereof beyond the side members, a sprocket fixed to said main shaft above the sprocket on said auger means and there being a chain trained over such sprockets whereby a driving connection is established between the main shaft and the auger means adjacent said other side member and on one side of the assemblage, a gear box fixed to the inner side of said one side member and through which gear box a corresponding end portion of said main shaft projects, a gear fixed to said main shaft within said gear box and there being an output shaft extending forwardly from said gear box having driving connection with said gear whereby the main shaft may be connected to the power take-off of an associated tractor at the other side of the assemblage, a sprocket fixed to said main shaft in the central region thereof, a trencher frame including rearwardly projecting arms having forward end portions straddling said main frame and journalled upon the exposed opposite ends of said main shaft whereby the above and forwardly of said main shaft and of said stands, and there being a flexible element extending between the last mentioned shaft and the top end of said stands and secured to the stands to exert a rearward pull upon the stands when wound up on the last mentioned shaft to turn the trenching mechanism on the main shaft to an elevated position.

4. A ditching attachment for tractors comprising a main frame including a pair of substantially vertical plate-like side members, a main shaft journalled between said side members, a housing fixed to the inner face of one of said side members and into which said main shaft extends, a bevel gear fixed to said main shaft within said housing and a pinion gear meshed with said bevel gear and having a shaft portion extending from said housing, means for connecting said pinion shaft to the power take off of an associated tractor, a trench digger frame pivotally attached to said main frame and extending rearwardly therefrom, a sprocket on said main shaft between said side members, an idler roller at the rear extremity of said digger frame, an endless chain trained about said sprocket and said idler roller, said chain having a plurality of digging members thereon, means for pivoting said digger frame to selected positions relative to said main frame to raise and lower the digger mechanism, a pair of drive gears, means for attaching said drive gears to the inner sides of a pair of wheels of an associated tractor, a drive shaft, means for operatively mounting said drive shaft on the said associated tractor gears carried by said drive shaft and engaged with said drive gears, and a drive connection between one end of said main shaft and said drive shaft for imparting step by step forward motion to an associated tractor in synchronization with the operation of said digging mechanism.

5. A ditching attachment for tractors comprising a main frame including a pair of substantially vertical plate-like side members, a main shaft journalled between said side members, a housing fixed to the inner face of one of said side members and into which said main shaft extends, a bevel gear fixed to said main shaft within said housing and a pinion gear meshed with said bevel gear and having a shaft portion extending from said housing, means for connecting said pinion shaft to the power take off of an associated tractor, a trench digger frame pivotally attached to said main frame and extending rearwardly therefrom, a sprocket on said main shaft between said side members, an idler roller at the rear extremity of said digger frame, an endless chain trained about said sprocket and said idler roller, said chain having a plurality of digging members thereon, means for pivoting said digger frame to selected positions relative to said main frame to raise and lower the digger mechanism, a pair of drive gears, means for attaching said drive gears to the inner sides of a pair of wheels of an associated tractor, a drive shaft, means for operatively mounting said drive shaft on the said associated tractor, gears engaged with said drive gears carried by said drive shaft and, a drive connection between one end of said main shaft and said drive shaft for imparting step by step forward motion to an associated tractor in synchronization with the operation of said digging mechanism, said drive connection including a connecting rod extending forwardly from said one end of the main shaft and being connected to an eccentric portion thereof whereby rotation of the main shaft imparts reciprocating motion to said connecting rod, and a pawl and ratchet mechanism connecting the forward end of said connecting rod to said drive shaft.

6. A digging attachment for tractors comprising a main frame, means carried thereby for attaching the frame to a tractor in trailing relation to the latter, a digger frame pivotally attached to and trailing said main frame, means for selectively pivoting said digger frame to raise and lower the same to vary the depth to which the digging is achieved, a pair of gear members, means for attaching the gear members to the inner sides of the wheels of the tractor to which the main frame is attached, a drive shaft having drive pinions thereon, means for operatively attaching said drive shaft to said tractor with the drive pinions in mesh with said drive gears, a main shaft carried rotatably by said main frame, a drive member on said main shaft, means engaged with said drive member and carried by said digger frame for digging earth and forming a trench, drive means for connection to the power take off of the said tractor for rotating said main shaft, and a drive connection extending forwardly from said main shaft to said drive shaft for rotating the latter so as to achieve synchronization between the forward movement of the associated tractor and the digging action of the attachment.

7. A digging attachment for tractors comprising a main frame, means carried thereby for attaching the frame to a tractor in trailing relation to the latter, a digger frame pivotally attached to and trailing said main frame, means for selectively pivoting said digger frame to raise and lower the same to vary the depth to which the digging is achieved, a pair of gear members, means for attaching the gear members to the inner sides of the wheels of the tractor to which the main frame is attached, a drive shaft having drive pinions thereon, means for operatively attaching said drive shaft to said tractor with the drive pinions in mesh with said drive gears, a main shaft carried rotatably by said main frame, a drive member on said main shaft, means engaged with said drive member and carried by said digger frame for digging earth and forming a trench, drive means for connection to the power take off of the said tractor for rotating said main shaft, and a drive connection extending forwardly from said main shaft to said drive shaft for rotating the latter so as to achieve synchronization between the forward movement of the associated tractor and the digging action of the attachment, an auger shaft assembly carried by said main frame disposed transversely of the forward motion of an associated tractor, drive means interconnecting said auger shaft and said main shaft whereby the operation of the digger, the auger and the forward motion of the tractor are synchronized.

8. A digging attachment for tractors comprising a main frame, means carried thereby for attaching the frame to a tractor in trailing relation to the latter, a digger frame pivotally attached to and trailing said main frame, means for selectively pivoting said digger frame to raise and lower the same to vary the depth to which the digging is achieved, a pair of gear members, means for attaching the gear members to the inner sides of the wheels of the tractor to which the main frame is attached, a drive shaft having drive pinions thereon, means for operatively attaching said drive shaft to said tractor with the drive pinions in mesh with said drive gears, a main shaft carried rotatably by said main frame, a drive member on said main shaft, means engaged with said drive member and carried by said digger frame for digging earth and forming a trench, drive means for connection to the power take off of the said tractor for rotating said main shaft, and a drive connection extending forwardly from said main shaft to said drive shaft for rotating the latter so as to achieve synchronization between the forward movement of the associated tractor and the digging action of the attachment, said drive means for the drive shaft comprising a connecting rod connected eccentrically to one end of said main shaft and pawl and ratchet means interconnecting the forward extremity of said connecting rod with said main shaft.

9. The assembly as defined in and by claim 8 wherein means is provided for varying the stroke of said pawl and ratchet means.

10. A digging attachment for tractors comprising a main frame including a pair of spaced generally vertical plate-like assemblies rigidly interconnected and provided with means for attachment to the draft arms of a tractor, trencher frame is swingable about the axis of the main shaft, means carried by said main frame and connected to said trencher frame for selectively swinging the latter, a sprocket fixed to the rearward extremity of said trencher frame and trenching means trained about the sprocket on the trencher frame and the sprocket in the central region of the main shaft whereby rotation of the main shaft will effect operation of the trenching means.

17. A trenching attachment for a farm-type tractor of the kind having a rear driving axle assembly including a pair of drive wheels, a pair of rearwardly extending draw links, an upper stabilizing bar, and a power take-off; comprising, in combination, a frame adapted to be mounted on said links and bar, said frame including a pair of vertically disposed side members having means to engage said links, a transversely disposed drive shaft journaled in said frame side members, means to drive said shaft from the power-take off of the tractor, a rearwardly extending boom comprising a yoke-like assembly pivotally mounted on said shaft outwardly of said frame side members for movement about the axis of said shaft, a sprocket keyed to said shaft, an idler wheel journaled on the rear end of said boom for rotation about a transverse axis, an endless cutter chain entrained over said sprocket and said idler wheel and operative to move loose earth from a trench being dug to a position below and forwardly of said shaft, a transversely disposed earth-moving auger rotatably carried by said frame and extending below and outwardly of one side member thereof and being so positioned as to receive loose earth from said cutter chain and move same to one side of the trench being dug, driving means interconnecting said shaft and said auger, and means for selectively pivoting said boom in a vertical plane to vary the digging depth of the boom and cutter chain.

18. In combination with a farm-type tractor having a rear driving axle assembly including a pair of drive wheels, a pair of rearwardly extending draw links, an upper stabilizing bar, and a power take off; a trenching attachment comprising, a frame mounted on said links and bar, said frame including a pair of vertically disposed side members having means engaging said links, a transversely disposed drive shaft journaled in said frame side members, means to drive said shaft from the power take-off of the tractor, a rearwardly extending boom comprising a yoke-like assembly pivotally mounted on said shaft outwardly of said frame side members for movement about the axis of said shaft, a sprocket keyed to said shaft, an idler wheel journaled on the rear end of said boom for rotation about a transverse axis, an endless cutter chain entrained over said sprocket and said idler wheel and operative to move loose earth from a trench being dug to a position below and forwardly of said shaft, a transversely disposed earth-moving auger rotatably carried by said frame and extending below and outwardly of one side member thereof and being so positioned as to receive loose earth from said cutter chain and move same to one side of the trench being dug, driving means interconnecting said shaft and said auger, means for selectively pivoting said boom in a vertical plane to vary the digging depth of the boom and cutter chain, and means driven by said drive shaft for imparting inching drive to the tractor drive wheels.

References Cited in the file of this patent

UNITED STATES PATENTS

| | | |
|---|---|---|
| 16,885 | Smith | Mar. 24, 1857 |
| 670,383 | Carlson | Mar. 19, 1901 |
| 824,740 | Poulson | July 3, 1906 |
| 905,551 | Matson et al. | Dec. 1, 1908 |
| 1,180,164 | Lorio | Apr. 18, 1916 |
| 2,252,837 | Dicke | Aug. 19, 1941 |
| 2,311,834 | Hollmann | Feb. 23, 1943 |
| 2,472,758 | Przybylski | June 7, 1949 |
| 2,519,075 | Schmidt | Aug. 15, 1950 |
| 2,692,446 | Smith | Oct. 26, 1954 |
| 2,747,307 | Griffin | May 29, 1956 |

FOREIGN PATENTS

| | | |
|---|---|---|
| 513,849 | France | Feb. 24, 1921 |